INVENTOR.
Byron L. Brucken

INVENTOR.
Byron L. Brucken

United States Patent Office 2,894,698
Patented July 14, 1959

2,894,698

VERTICAL SUPPORT SHAFT FOR MOTOR ROTOR ARMATURE AND COMMINUTOR IMPELLER DISC

Byron L. Brucken, Dayton, Ohio, assignor to General Motors Corporation, Detroit, Mich., a corporation of Delaware Application September 29, 1955, Serial No. 537,358

2 Claims. (Cl. 241—257)

This invention relates to a domestic appliance and more particularly to comminuting apparatus.

It is an object of this invention to provide a comminuting apparatus with a simplified low cost motor mounting and bearing arrangement.

These and other objects are attained in the form disclosed in which the housing of the cutting chamber is formed entirely of synthetic resilient rubber provided with a sink connection at the top and connected to a housing at the bottom forming the outlet arrangement and supporting the motor and impeller. A metal shredder ring is housed within the lower portion of the rubber housing and has an outwardly extending flange extending between the outwardly extending flange of the rubber housing and the metal housing. The lower portion of the rubber housing is surrounded by a metal ring which is provided with a flange extending over the flange of the rubber housing which is fastened by screws to the metal housing in such a way that the flanges are tightly gripped and held and sealed to the metal housing. The metal housing is provided with a long downwardly extending centrally located bearing recess supporting dual bearings in turn supporting at an intermediate section the shaft for the impeller above and the motor rotor below.

Further objects and advantages of the present invention will be apparent from the following description, reference being had to the accompanying drawings wherein a preferred embodiment of the present invention is clearly shown.

Figure 1:
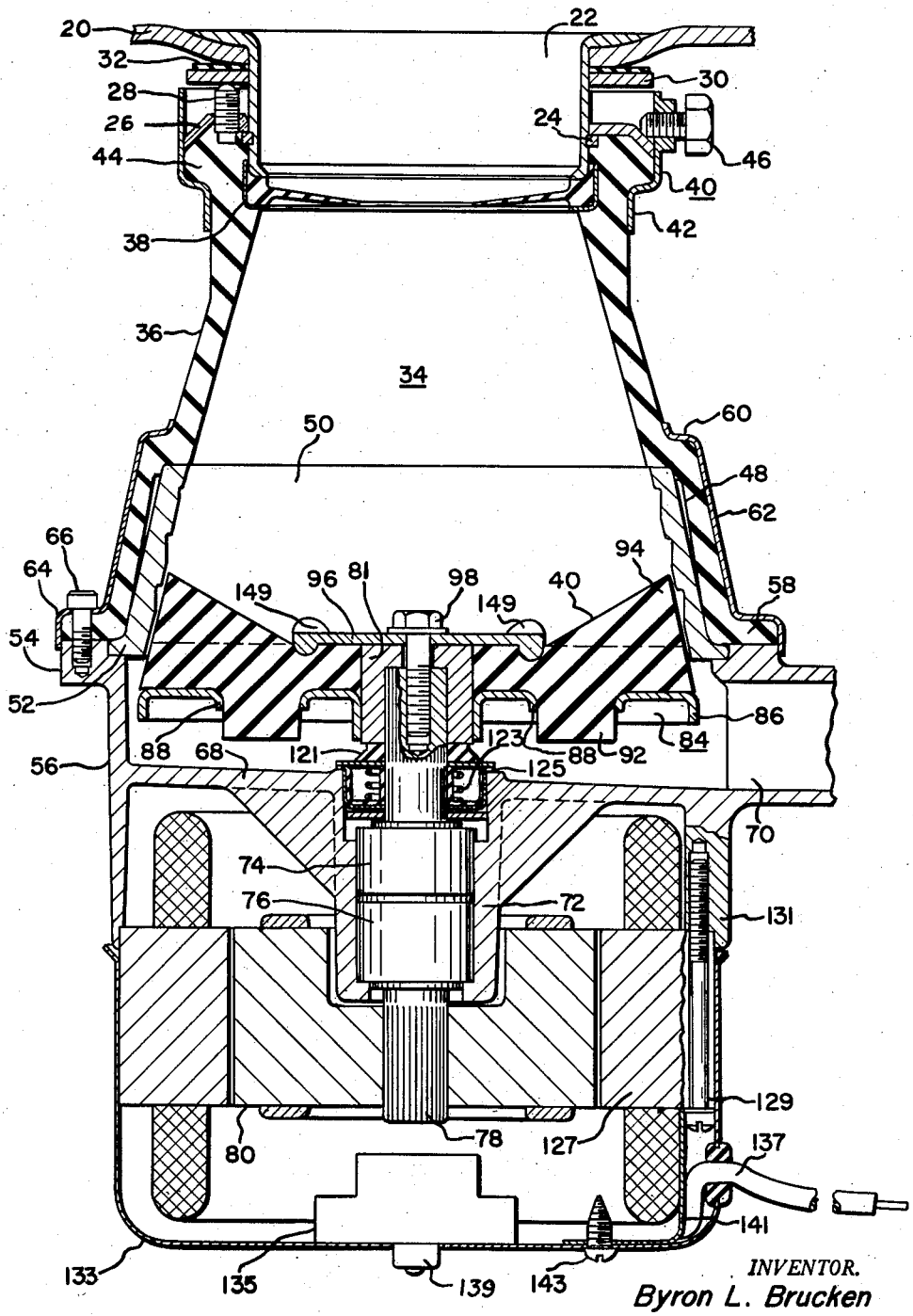
Figure 1 is a vertical sectional view of a comminuting apparatus embodying one form of my invention.
Figure 2:
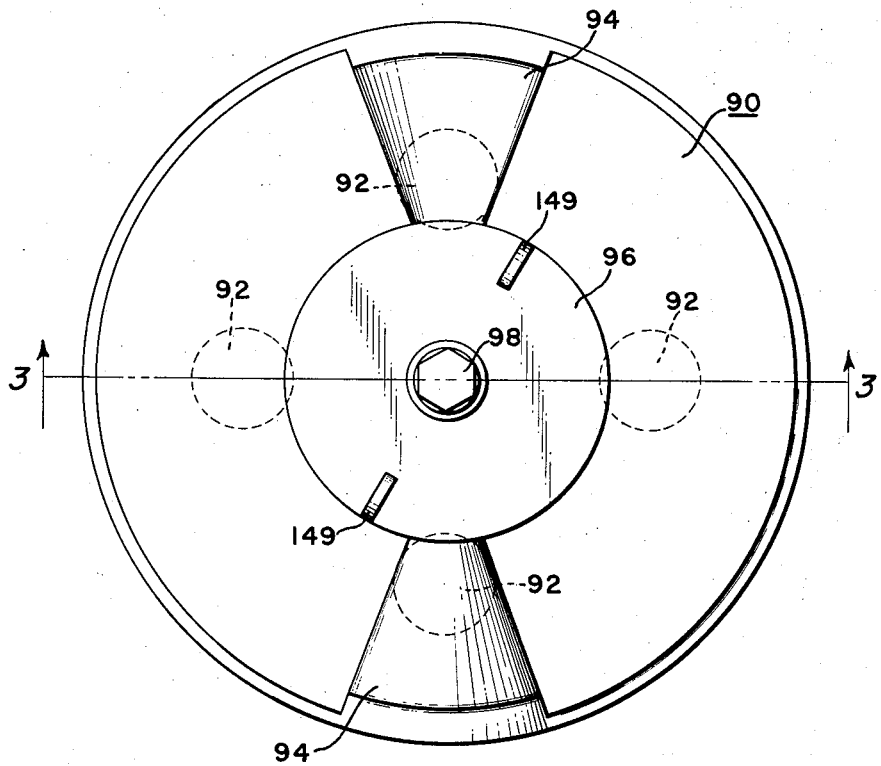
Figure 2 is a top view of the impeller shown in Figure 1
Figure 3:
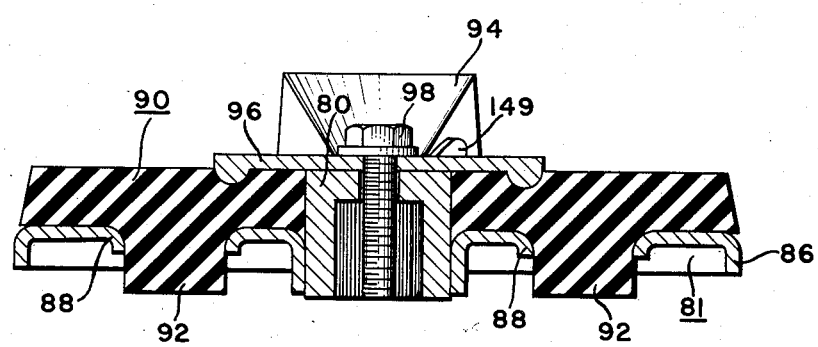
Figure 3 is a sectional view of the impeller taken along the line 3—3 of Figure 2.

Referring now to the drawings and more particularly to Figure 1, there is shown a metal sink bottom 20 having an opening which receives the flanged metal thimble member 22. This thimble 22 is grooved to receive a key ring 24 on its outer surface. This ring 24 supports a ring 26. This ring 26 is provided with set screws 28 extending upwardly into engagement with a ring 30 which holds the gasket 32 tightly in engagement with the bottom of the sink 20 surrounding the opening.

According to this invention, the entire upper housing surrounding the cutting chamber 34 is formed of a single member 36 of a suitable synthetic elastic rubber such as Hycar or Buna N. The upper portion of this rubber housing 36 is recessed to receive the rubber guard 38 having inwardly extending rubber fingers. The rim of this rubber guard is enclosed in a flanged metal ring. This rubber guard is held in place by the metal thimble 22. The upper portion of the rubber housing member is fastened to the ring 26 by an outer ring 40 having a lower inwardly extending offset flange 42 which lodges against the outwardly extending upper flange 44 of the rubber housing 36. The ring 40 is threaded to receive the set screws 46 which thread through the ring 40 and rest upon the downwardly tapered flange of the ring 26 which, in turn, rests upon the keyring 24. In this way, the upper portion of the rubber housing 36 is fastened to the opening in the sink 20 in such a way that it can be readily attached or detached merely by removing or inserting the set screws 46.

The rubber housing 36 is generally in the shape of a truncated cone. Its lower portion is provided with an annular recess 48 within which is lodged a metal shredder ring 50. The bottom of this shredder ring 50 is provided with an outwardly turned flange 52 extending into an annular recess in the upper flange 54 of the lower metal housing 56. The bottom portion of the rubber housing 36 is provided with an outwardly extending flange 58 which rests upon the upper flange 54 of the lower metal housing 56. The recessed portion 48 of the rubber housing 36 causes the formation of an enlarged lower portion of the rubber housing 36. The top of this enlarged lower portion forms a shoulder which supports the inwardly extending shoulder 60 of a metal ring 62 which encloses the lower portion of the rubber housing 36. The lower portion of this metal ring 62 is provided with a downwardly extending offset flange 64 which extends over the flange 58 as well as the flange 54. The flanges are connected together by the clamping screws 66 which extend downwardly through the flanges 64, 58 and into the flange 54 as shown in Figure 1. This connection provides a firm, yet resilient, support for the shredder ring 50 and for the lower metal housing 56.

The lower metal housing 56 is provided with a bottom wall 68 for the cutting chamber 34 and also with a lateral outlet connection 70 at and above the bottom wall 68. This bottom wall 68 is provided with a downwardly extending recessed bearing support 72 containing the upper and lower ball bearings 74 and 76. These bearings 74 and 76 support the motor shaft 78 having upper and lower splined ends. Because the bearings 74 and 76 are so close together that they substantially constitute a single bearing, the shaft 78 has only a single bearing area which is located at an intermediate point. This provides a cantilever motor shaft mounting since the motor shaft is otherwise unsupported. The recessed bearing support 72 has an inwardly extending shoulder at the bottom to hold the bearings 74 and 76 from downward movement. The motor rotor 80 is fastened to the lower end of the shaft 78. The upper end of the shaft 78 fits into the hub 81 which is bonded to a flanged circular metal plate 84 having a downwardly turned outer rim 86 and a plurality of flanged perforations 88. Above the plate 86 is an impeller member 90 of synthetic resilient elastic rubber such as Hycar or Buna N. This member 90 has downwardly extending projections 92 fitting within each of the flanged apertures 88 in the plate 84 to form an interlocking connection between the members 90 and 84. The member 90 is provided with diametrically opposite fixed upwardly extending vanes 94 to carry the material to be comminuted into engagement with the cutting edges of the shredder ring 50. These vanes 94 are integral with the other portions of the member 90 and made of the same rubber. By the resiliency of the vanes 94 and the resilient mounting of the shredder ring 50, the impact loads are cushioned and reduced and also noise is reduced and the stress and strain upon the grinding member in general is reduced. The member 90 is held in place upon the plate 84 by the top plate 96 having a downwardly extending outer flange which extends into an annular groove in the top of the member 90 to hold the inner portion of the member 90 tightly clamped inbetween this top plate 96 and the plate 84. The top plate 96 is provided with a set of diametrically opposite upstanding ears 149 which flip over semi-circular and rounded objects like grapefruit hulls and orange peelings and cabbage and head lettuce leaves so as to throw them into the path of the vanes and into the shredder ring. The top plate 96 is held in place upon the hub 81 by a screw 98 which threads down into the top of the shaft 78.

The wall 68 is sealed by the shaft seal 121 which bears against the lower face of the hub 81. This seal is provided with a downwardly extending rubber skirt. A compression type coil spring 123 extends between the seal portion and the skirt in order to hold the skirt in sealing engagement with a flanged cup-shaped member 125 extending into the bearing recess in the top wall 68. This seal arrangement prevents liquids and foreign matter from passing from the cutting chamber 34 into contact with the bearings 74 and 76.

The motor stator 127 surrounds the rotor 80 and is fastened directly by long screws 129 to a downwardly extending annular flange 131 which extends downwardly from the top plate 68 and is an integral part of the housing 56. The lower portion of the stator 127 is enclosed by a cup-shaped member 133 provided with a motor protector 135 connected in series with the stator 127 and the supply conductors 137. The motor protector 135 may be either of the automatic reset type or of the manual reset type and provided with an external reset button 139 at the bottom. This cup member 133 is supported by the bracket 141 and connected thereto by screws 143. The top of this bracket 141 extends beneath the heads of the screws 129.

By this particular arrangement, the noise and vibration of the motor and the impact between the impeller and particles to be ground and the shredder ring are absorbed by the resilient elastic impeller portion 90 and by the rubber housing 36. This resilient arrangement reduces the shock loads upon the bearings and also simplifies and makes less expensive the construction.

If desired, other elastomers, in addition to the aforementioned Hycar and Buna N rubber-like materials, may be used such as suitably compounded natural rubber, butadiene acrylonitrile copolymers, butadiene styrene copolymers, chloroprene copolymers, polysulfide rubbers and mixtures of these may be used.

While the embodiment of the present invention as herein disclosed constitutes a preferred form, it is to be understood that other forms might be adopted.

What is claimed is as follows:

1. Comminuting apparatus including a housing enclosing a cutting chamber containing a shredder ring, a motor mounting beneath said housing provided with a laterally extending wall forming the bottom of the housing, said wall in its central portion being provided with a long downwardly extending centrally located bearing recess having a substantially vertical axis, said recess being provided with a shoulder of reduced diameter at the bottom, dual bearing means having directly adjacent upper and lower portions coaxially arranged and located in said recess above said shoulder, a cantilever mounted shaft having its intermediate portion rotatably mounted in said dual bearing means constituting its sole support having end portions projecting therefrom, an impeller mounted upon the upper end of said shaft above said bearing means, a motor rotor mounted upon the lower end of said shaft below said bearing means, and a motor stator mounted upon said motor mounting.

2. Comminuting apparatus including a housing enclosing a cutting chamber containing a shredder ring, a motor mounting beneath said housing provided with a laterally extending wall forming the bottom of the housing, said wall in its central portion being provided with a long centrally located downwardly extending bearing recess having a substantially vertical axis, said recess having a shoulder of reduced diameter at its bottom, dual bearing means having directly adjacent upper and lower portions coaxially arranged and located in said recess above said shoulder, a cantilever mounted shaft having at its intermedite portion a single bearing area constituting its sole support rotatably mounted in said dual bearing means with its end portions projecting therefrom, an impeller mounted upon the upper end of said shaft above said bearing means, a motor rotor mounted upon the lower end of said shaft below said bearing means, and a motor stator mounted upon said motor mounting, said motor rotor having laminations and a coaxially extending recess in its upper laminations surrounding the lower portion of said bearing recess and said bearing means.

References Cited in the file of this patent
UNITED STATES PATENTS

| | | |
|---|---|---|
| 2,225,171 | Hammes | Dec. 17, 1940 |
| 2,562,736 | Powers | July 31, 1951 |
| 2,642,233 | Powers | June 16, 1953 |
| 2,682,376 | Frank | June 29, 1954 |
| 2,709,965 | Litzenberg | June 7, 1955 |
| 2,719,011 | Bebinger | Sept. 27, 1955 |
| 2,743,875 | Brezosky | May 1, 1956 |
| 2,767,927 | Green | Oct. 23, 1956 |
| 2,816,506 | Tweedy | Dec. 17, 1957 |